United States Patent [19]

Leshem

[11] Patent Number: 5,729,763
[45] Date of Patent: Mar. 17, 1998

[54] DATA STORAGE SYSTEM

[75] Inventor: Eli Leshem, Brookline, Mass.

[73] Assignee: EMC Corporation, Hopkinton, Mass.

[21] Appl. No.: 515,243

[22] Filed: Aug. 15, 1995

[51] Int. Cl.$^6$ .................................................. G06F 11/20
[52] U.S. Cl. .......................... 395/858; 395/441; 395/181; 395/182.03
[58] Field of Search .............................. 395/858, 180, 395/181, 182, 441; 371/10

[56] References Cited

U.S. PATENT DOCUMENTS

| | | | |
|---|---|---|---|
| 5,077,736 | 12/1991 | Dunphy, Jr. et al. | 371/10.1 |
| 5,119,488 | 6/1992 | Takamatsu et al. | 395/182.02 |
| 5,269,011 | 12/1993 | Yanai et al. | 395/425 |
| 5,363,502 | 11/1994 | Kagimasa | 395/575 |
| 5,371,882 | 12/1994 | Ludlam | 395/182.05 |
| 5,479,653 | 12/1995 | Jones | 395/182.03 |
| 5,504,882 | 4/1996 | Chai et al. | 395/182.03 |
| 5,544,339 | 8/1996 | Baba | 395/441 |
| 5,546,535 | 8/1996 | Stallmo et al. | 395/182.07 |
| 5,548,711 | 8/1996 | Brant et al. | 395/182.03 |

Primary Examiner—Christopher B. Shin
Attorney, Agent, or Firm—Fish & Richardson P.C.

[57] ABSTRACT

A data storage system is provided wherein each one of a plurality of disk interfaces is coupled to a corresponding storage disk drive. The disk interfaces in one portion are coupled through a first unidirectional channel to a first disk controller and the disk interfaces in another portion of the disk interfaces are coupled through a second unidirectional channel to a second disk controller. Each disk interface includes a switch adapted to allow data to pass to another disk drive in the channel thereof; and, when the other channel becomes inoperative, coupling the disk drive in the inoperative channel to the operative fiber channel. With such arrangement, a disk drive may be removed without requiring a shut-down of the storage system (i.e., the disk drive may be "hot swapped"). In one embodiment, a pair of the switches is disposed on the common printed circuit board with the disk interface for enabling depopulation, or removal of, disk drives from the storage system.

6 Claims, 5 Drawing Sheets

DATA STORAGE SYSTEM

BACKGROUND OF THE INVENTION

This invention relates generally to data storage systems and more particularly to data storage systems having a plurality of magnetic storage disk drives in a redundancy arrangement whereby the disk drives are controllable by primary disk controllers and secondary disk controllers. Still more particularly, the invention also relates to systems of such type wherein the disk drives are coupled to the disk controllers through a series, unidirectional, "ring" or, fiber channel protocol, communication system.

As is known in the art, in one type of data storage system, data is stored in a bank of magnetic storage disk drives. Each one of the disk drives is coupled to a corresponding disk interface. The disk interface is a printed circuit board having a programmable array logic (PAL) circuit for decoding address signals fed to it by a disk controller. When the PAL detects its address, it produces a signal to activate a relay and thereby turn its disk drive "on". The PAL is also used to turn its LED "on" when the disk drive needs to be replaced.

The disk drives, and their coupled interfaces, are arranged in sets, each set being controlled by a primary disk controller and a secondary disk controller. More particularly, in order to enable the set of disk drives to operate in the event that there is a failure of the primary disk controller, each set is also coupled to a secondary, or redundant disk controller. Therefore, if either the primary or secondary disk controller fails, the set can be accessed by the other one of the disk controllers.

While today, most disk storage systems of this type use a Small Computer System Interconnection (SCSI) protocol, in order to operate with higher data rates, other protocols are being introduced. One higher data rate protocol is sometimes referred to as a fiber channel (FC) protocol. Such FC channel protocol uses a series, unidirectional, "ring" communication system. In order to provide for redundancy, that is, to enable use of the set of disk drives in the event that the primary disk controller fails, as discussed above, the set is coupled to the second, or redundant disk controller, using a separate, independent, "ring", or fiber channel communication protocol. Thus, two fiber channels are provided for each set of disk drives and their disk interfaces; a primary fiber channel and a secondary fiber channel.

As is also known, when using the fiber channel communication protocol, if any element in the channel becomes inoperative, the entire channel becomes inoperative. That is, if the primary disk controller becomes inoperative, or if any one of the disk drives in the set coupled to the primary channel becomes inoperative (i.e., as where the disk interface fails, the disk interface is inoperative, or removed with its coupled disk drive, or where the disk drive coupled thereto fails, or is removed), the primary fiber channel, is "broken", or open, and becomes inoperative. The data stored in the entire portion of the set of disk drives coupled to the primary disk channel is therefore unavailable until the inoperative primary disk controller or inoperative disk drive is replaced. This is true with either the primary channel or the secondary channel. One technique suggested to solve this problem is through the use of a switch, sometimes referred to as an LRC (i.e., a loop resiliency circuit) switch. Such LRC switch is used to remove an inoperative disk drive from its channel.

In one suggested arrangement, a printed circuit board is provided for each disk drive. The printed circuit board has a pair of LRCs, one for the primary channel and one for the secondary channel. Thus, the open channel may be "closed" in the event of an inoperative disk drive by placing the LRC thereof in a by-pass condition. While such suggested technique solves the inoperative disk drive, or open channel problem, if one of the pair of LRCs fails, the entire printed circuit board having the pair of LRCs must be replaced thereby disrupting both the primary and secondary channels; and, hence, disrupting the operation of the entire data storage system.

One technique suggested to solve this disruption problem requires n LRC switches (where n is the number of disk drives in the set) in the primary channel, i.e., one LRC for each one the n disk drives in the set and another n LRC switches in the secondary channel for each one of the n disk drives in the secondary channel. The primary channel set of n LRCs is mounted on one printed circuit board and the secondary channel set of n LRCs is mounted on a different printed circuit board. A backplane is used to interconnect the two LRC printed circuit boards, the associated multiplexers, and the disk drives. In order to provide the requisite serial, or sequential, fiber channel connections, an elaborate, complex, fan-out wiring arrangement has been suggested for the backplane. Further, the slots provided for the two LRC boards eliminates two disk drives, and the disk interfaces which would otherwise be plugged into these two slots of the backplane.

SUMMARY OF THE INVENTION

In accordance with the present invention, a data storage system is provided wherein each one of a plurality of disk interfaces is coupled to a corresponding storage disk drive. A first portion of the disk interfaces is coupled to a first disk controller through a first unidirectional channel and a second portion of the disk interfaces is coupled to a second disk controller through a second unidirectional channel. Each disk interface in the first portion includes a switch adapted to allow address control and data (hereinafter referred to, collectively, as data) to pass though the first channel; and, when the second channel becomes inoperative, couple an operative disk drives in the inoperative second channel to the first channel. With such arrangement, redundancy is provided because if the second disk controller becomes inoperative, the first disk controller is able to store data in and/or retrieve data from the disk drives in the second channel. Further, if one of the disk drives in the second channel is inoperative, all of the other, operative disk drives in the second channel are switched to the first channel, thereby enabling the disk drive to be replaced without having to shut down the operative disk drives in the second channel, i.e., the inoperative disk drive may be "hot swapped".

In accordance with another feature of the invention, the switch is disposed on a common printed circuit board with the disk interface. Thus, the interface and its disk drive are packaged as a module to facilitate maintenance and providing system modularity. With such arrangement a simpler, local (i.e, the disk interface and the switch are located on a common printed circuit board) connecting arrangement is used to interconnect the disk drives and their associated switches as compared with the complex, fan-out connection arrangement discussed above. Still further, with this arrangement, there is no loss of slots on the backplane.

In accordance with still another feature of the invention, each disk interface includes a pair of the switches. The additional switch enables termination of a channel at a point where additional disk drives are no longer needed. Thus, the second switch enables "depopulation" or removal of a portion of the disk drives in the channel when a such portion is no longer needed by the storage system.

DESCRIPTION OF THE PREFERRED EMBODIMENTS

Figure 1:
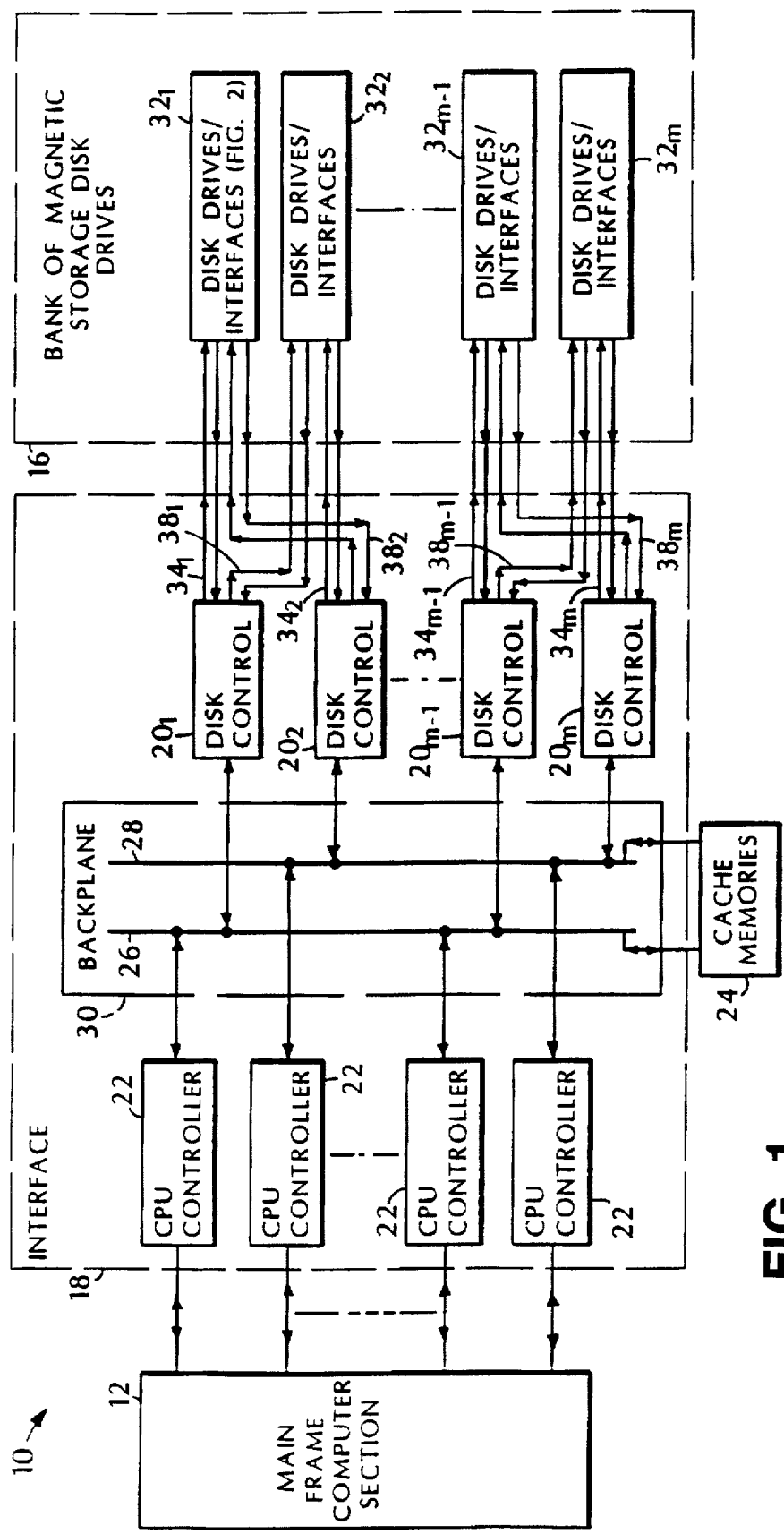
FIG. 1 is a block diagram of a computer system having a data storage system according to the invention.

Referring now to FIG. 1, a computer system 10 is shown. The computer system 10 includes a main frame computer section 12 for processing data. Portions of the processed data are stored in, and retrieved data from, a bank 16 of magnetic storage disk drives through an conventional system interface 18. The system interface 18 includes disk controllers $20_1$-$20_m$, central processor unit (CPU) controllers 22 and cache memories 24 electrically interconnected, in a conventional manner, as shown, through a pair of buses 26, 28 provided for redundancy in a backplane printed circuit board 30. Thus, disk controllers $20_1, \ldots 20_{m-1}$ are coupled to bus 26, and disk controllers $20_2 \ldots 20_m$ are coupled to bus 28, as shown. Each one of the disk controllers $20_1$-$20_m$ is coupled to a corresponding one of sets $32_1$-$32_m$ of the disk drives $40_1$-$40_n$ and associated disk interfaces $42_1$-$42_n$, respectively, as shown, through primary fiber channel protocol channels $34_1$-$34_m$, respectively, as shown. Each one of the sets $32_1$-$32_m$ of disk drives and associated disk interfaces is identical in construction, an exemplary one thereof, here set $32_1$ being shown, and discussed in detail, in connection with FIG. 2. Further, each one of the disk controllers $20_1$-$20_m$ is coupled to another one of the sets $32_1$-$32_m$ of disk drives $40_1$-$40_n$ and associated disk interfaces $42_1$-$42_n$ through secondary fiber protocol channels $38_1$-$38_m$, as shown, here indicated by dotted lines. Thus, for example, disk controller $20_1$ is coupled to set $32_1$ through primary fiber channel $34_1$ and is also coupled to set $32_2$ through secondary fiber channel $38_1$. Likewise, disk controller $20_2$ is coupled to set $32_2$ through primary fiber channel $34_2$ and is also coupled to set $32_1$ through secondary fiber channel $38_2$, as shown. Thus, while set $32_1$ is, during normal mode of operation, coupled through disk controller $20_1$ to bus 26, in the event that disk controller $20_1$ becomes inoperative, set $32_1$ is coupled to bus 28 through disk controller $20_2$. Finally, it should be noted that the cache memories 24 are coupled to both buses 26 and 28, in a conventional manner.

Figure 2:
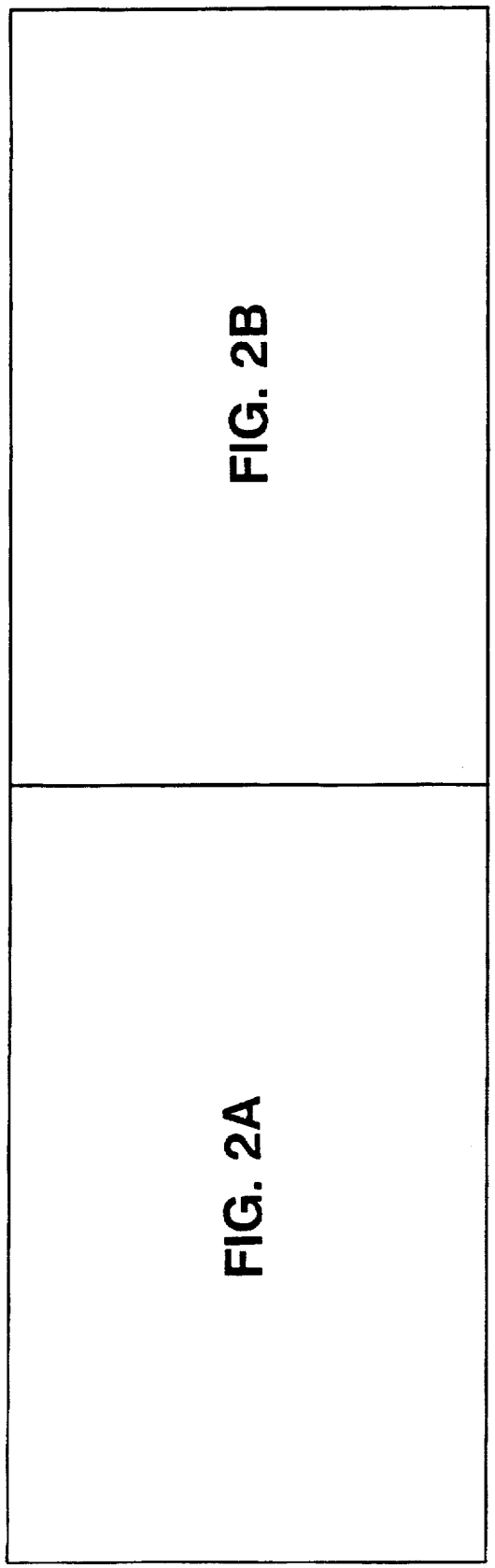
FIG. 2 is sketch showing how

Referring now also to FIG. 2, an exemplary one of the plurality of sets $32_1$-$32_m$, here set $32_1$ of disk drives $40_1$-$40_n$ and associated disk interfaces $42_1$-$42_n$, is shown. Each one of the disk interfaces $42_1$-$42_n$ is adapted to control a corresponding one of the magnetic storage disk drives $40_1$-$40_n$ coupled thereto, respectively, as shown. In normal mode of operation, data passes from the disk controller $20_1$ (FIG. 1) sequentially through the disk interfaces $42_1, 42_3, \ldots 42_{n-3}, 42_{n-1}$ (and hence through the disk drives $40_1, 40_3, \ldots 40_{n-3}, 40_{n-1}$ coupled thereto), via the primary fiber channel $34_1$; and, data passes from the disk controller $20_2$ sequentially through the disk interfaces $42_2, 42_4, \ldots 42_{n-2}, 42_n$ (and hence through the disk drives $40_2, 40_4, \ldots 40_{n-2}, 40_n$ coupled thereto), via the secondary fiber channel $38_1$, as indicated by the dotted lines.

More particularly, the disk interfaces $42_1$-$42_n$ are arranged in groups, or cells, $43_1$-$43_p$; here groups of two (i.e., pairs) of successive disk interfaces; thus, here p=n/2. Thus, pairs of disk interfaces $42_1, 42_2; 42_3, 42_4; \ldots 42_{n-1}, 42_n$, and their associated disk drives $40_1, 40_2; 40_3, 40_4; \ldots 40_{n-1}, 40_n$, are grouped together to form cells $43_1$-$43_{n/2}$, respectively as shown. Each one of the cells $43_1$-$43_{n/2}$ is identical in construction, an exemplary one thereof, here cell $43_1$ is shown to included disk interfaces $42_1, 42_2$, and their coupled disk drives $40_1, 40_2$, respectively, as indicated. Each one of the cells $43_1$-$43_{n/2}$ has a primary input port $PI_1$-$PI_{n/2}$, respectively, as shown, and a primary output port $PO_1$-$PO_{n/2}$, respectively, as shown. Each one of the cells $43_1$-$43_{n/2}$ has a secondary input port $SI_1$-$SI_{n/2}$, respectively, as shown, and a secondary output port $SO_1$-$SO_{n/2}$, respectively, as shown. The cells $43_1$-$43_{n/2}$ are sequentially (i.e. serially) coupled to the controllers $20_1, 20_2$ through the fiber channels $34_1, 38_1$, respectively, from primary output port PO to primary input port PI, for the primary fiber channel $34_1$ and from secondary input port SI to secondary output port SO, for the secondary channel $38_1$.

Each one of the disk interfaces $42_1$-$42_n$ includes a corresponding one of a plurality of switches $44_1$-$44_n$, as shown. Each one of the switches $44_1$-$44_n$ is identical in construction and, here, switches $44_1$-$44_n$ are conventional LRC switches. Thus, each one of the switches $44_1$-$44_n$ includes a pair of input ports $I_1, I_2$ and a pair of output ports $O_1, O_2$, as shown. When one of the switches $44_1$-$44_n$ is in the feed-through condition (as indicated by curved arrow B) the data fed to first input port $I_1$ thereof passes to the first output port $O_1$ thereof and, likewise, data fed to the second input port $I_2$ thereof passes to the second output port $O_2$ thereof; however, when of the switches $44_1$-$44_n$ is in the by-pass condition (as indicated by the arrows A), data fed to input port $I_1$ thereof is diverted from the first output port $O_1$ thereof and is coupled directly to the second output port $O_2$ thereof. Each one of the switches $44_1$-$44_n$ is placed in either the feed-through condition or the by-pass condition by a control signal fed thereto via control line $46_1$-$46_n$, respectively, as shown.

In the normal mode of operation, primary disk controller $20_1$ is coupled, as noted above, to disk drives $40_1, 40_3, \ldots 40_{n-3}, 40_{n-1}$, by primary fiber channel $34_1$. Likewise, secondary disk controller $20_2$ is coupled to disk drives $40_2, 40_4, \ldots 40_{n-2}, 40_n$ through secondary fiber channel $38_1$. (It should be noted that while the data is depicted as passing from the disk drives 40 and then to the switches 44, it is preferable that the data passes from the switches 44 and then to the disk drives, i.e., it is preferable that the direction indicated by the arrow in primary channel $34_1$ be reversed in direction). Thus, in the normal mode of operation, switch $44_1$ is in the by-pass condition, as indicate by the curved arrow A. Thus, data from disk controller $20_1$ is fed, via twisted pair 47, to primary input port $PI_1$ of cell $43_1$ to disk interface $42_1$, to disk drive $40_1$, then to the first input port $I_1$ of switch $44_1$. Because switch $44_1$ is in the by-pass condition by the control signal on control line $46_1$, data from disk drive $40_1$ passes directly to second output port $O_2$ and then to primary output port $PO_1$. From there, the data passes, in like manner, to disk interface $42_3$ of the next successive cell $43_2$, where the process repeats for disk drive $40_3$; and then, in like manner, sequentially through the other cells and to cells $43_{(n/2)-1}$-$43_n$ and then back to the primary controller $20_1$ (FIG. 1).

Likewise, in the normal mode of operation, switch $44_2$ is in the by-pass condition by a control signal on line $46_2$, as indicted by the arrow A and data from disk controller $20_2$ (FIG. 1) passes to secondary input port $SI_1$ of cell $43_1$, then from first input port $I_1$ of switch $44_2$ directly to second output port $O_2$ of switch $44_2$. The data then passes from disk drive $40_2$ to secondary output port $SO_2$. From there, the data passes, in like manner, to disk interface $42_4$ of the next successive cell $43_2$, where the process repeats for disk drive $40_4$; and then, in like manner, sequentially through the other cells and to cells $43_{(n/2-1)}$-$43_{n/2}$ and then back to the secondary controller $20_2$ (FIG. 1).

If disk controller $20_2$ becomes inoperative, for example, an effect which "breaks" the secondary channel "ring", the switches $44_1$, $44_3$ ... $44_{n-3}$,$44_{n-1}$ are placed in the feed-through condition by the control signal on line $46_1$, $46_3$ ... $46_{n-3}$, $46_{n-1}$ and therefore, primary disk controller $20_1$ is coupled, via primary fiber channel $34_1$, to disk drives $40_1$, $40_2$, $40_3$, $40_4$ ... $40_{n-3}$, $40_{n-2}$, $40_{n-1}$, $40_n$. More particularly, in such feed-through condition, indicted by the arrows B, data at the first input ports $I_1$ of switches $44_1$, $44_3$ ... $44_{n-3}$, $44_{n-1}$ pass directly to first output ports $O_1$ thereof, and passes to disk drives $40_2$, $40_4$ ... $40_{n-2}$, $40_n$, then directly from second input ports $I_2$ to second output ports $O_2$ of switches $44_1$, $44_3$ ... $44_{n-3}$, $44_{n-1}$ to primary channel output ports $PO_2$ thereby coupling disk interfaces $42_2$, $42_4$, ... $42_{n-2}$, $42_n$ and their coupled disk drives $40_2$, $40_4$, ... $40_{n-2}$, $40_n$ to the primary fiber channel $34_1$.

On the other hand, if the primary disk controller $20_1$ becomes inoperative, for example, an effect which "breaks" the primary channel "ring", the switches $44_2$, $44_4$ ... $44_{n-2}$, $44_n$ are placed in the feed-through condition and therefore, secondary disk controller $20_2$ is coupled, via secondary fiber channel $38_1$, to disk drives $40_1$, $40_2$, $40_3$, $40_4$ ... $40_{n-3}$, $40_{n-2}$, $40_{n-1}$, $40_n$. More particularly, in such feed through condition, disk interfaces $42_1$, $42_3$, ... $42_{n-3}$, $42_{n-1}$ and their coupled disk drives $40_1$, $40_3$, ... $40_{n-1}$, $40_{n-1}$ are coupled to the secondary fiber channel $38_1$.

If any one of the disk drives $40_2$, $40_4$, ... $40_{n-2}$, $40_n$, in the secondary channel $38_1$ becomes inoperative thereby breaking the secondary channel $38_1$, all other operative disk drives in the secondary channel $38_1$ become coupled to the primary channel $34_1$. For example, if disk drive $40_2$ becomes inoperative, an effect which "breaks" the secondary channel $38_1$, switches $44_3$-$44_{n-1}$ are switched from the by-pass condition to the feed through condition; switch $44_1$ remaining in the by-pass condition. Therefore, the primary disk controller $20_1$ becomes coupled to disk drives $40_1$, $40_3$, $40_4$, ... $40_{n-3}$, $40_{n-2}$, $40_{n-1}$, and $40_n$.

On the other hand, if any one of the disk drives $40_1$, $40_3$, ... $40_{n-3}$, $40_{n-1}$ in the primary channel $34_1$ becomes inoperative, thereby breaking the primary channel $34_1$, all other operative disk drives in the primary channel $34_1$ become coupled to the secondary channel $38_1$. For example, if disk drive $40_3$ becomes inoperative, an effect which "breaks" the primary channel $34_1$, switches $44_2$, $44_5$ (not shown), ... $44_{n-2}$, and $44_n$ are switched from the by-pass condition to the feed through condition; switch $44_4$ remaining in the by-pass condition. Therefore, the secondary disk controller $20_2$ becomes coupled to disk drives $40_1$, $40_2$, $40_3$, $40_5$ (not shown), ... $40_{n-3}$, $40_{n-2}$, $40_{n-1}$, and $40_n$.

Figure 3:
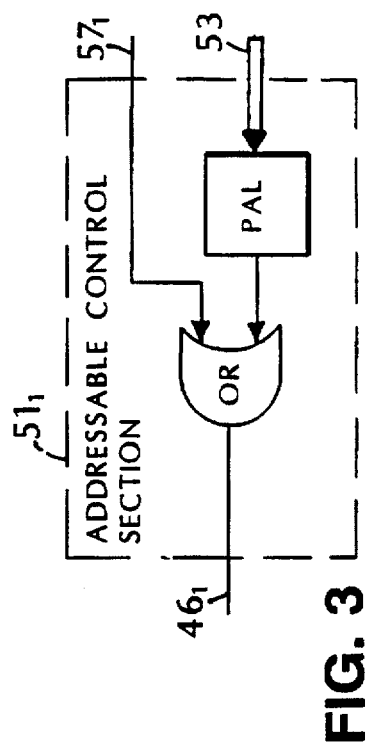
Figure 2A:
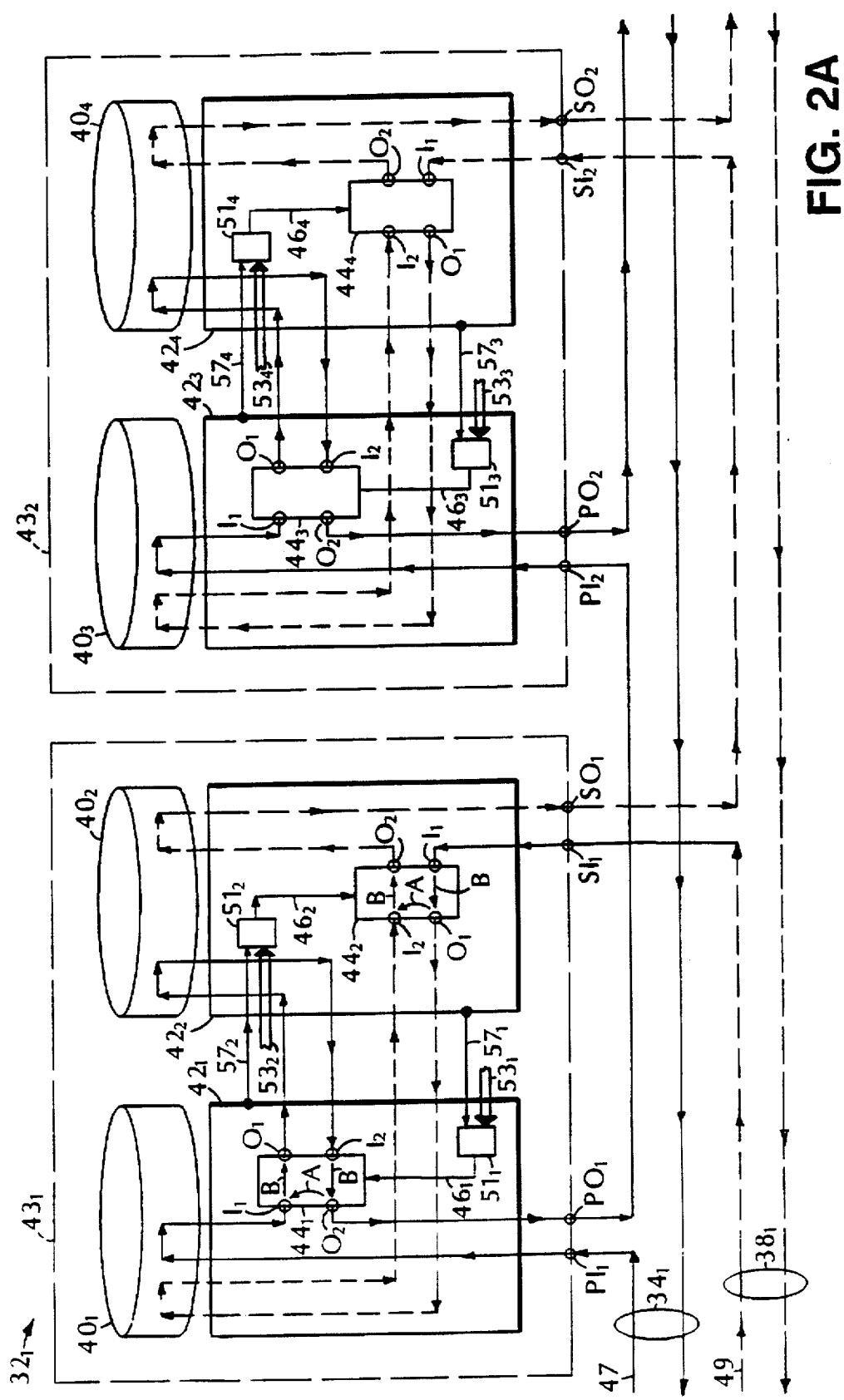
FIGS. 2A and 2B are arranged to make up a block diagram of a set of storage disk drives and their disk interfaces according to the invention, such set being used in the computer system of FIG. 1; and, FIG. 3 is a block diagram of an exemplary addressable interface used in the disk interfaces of FIG. 2.
Figure 2B:
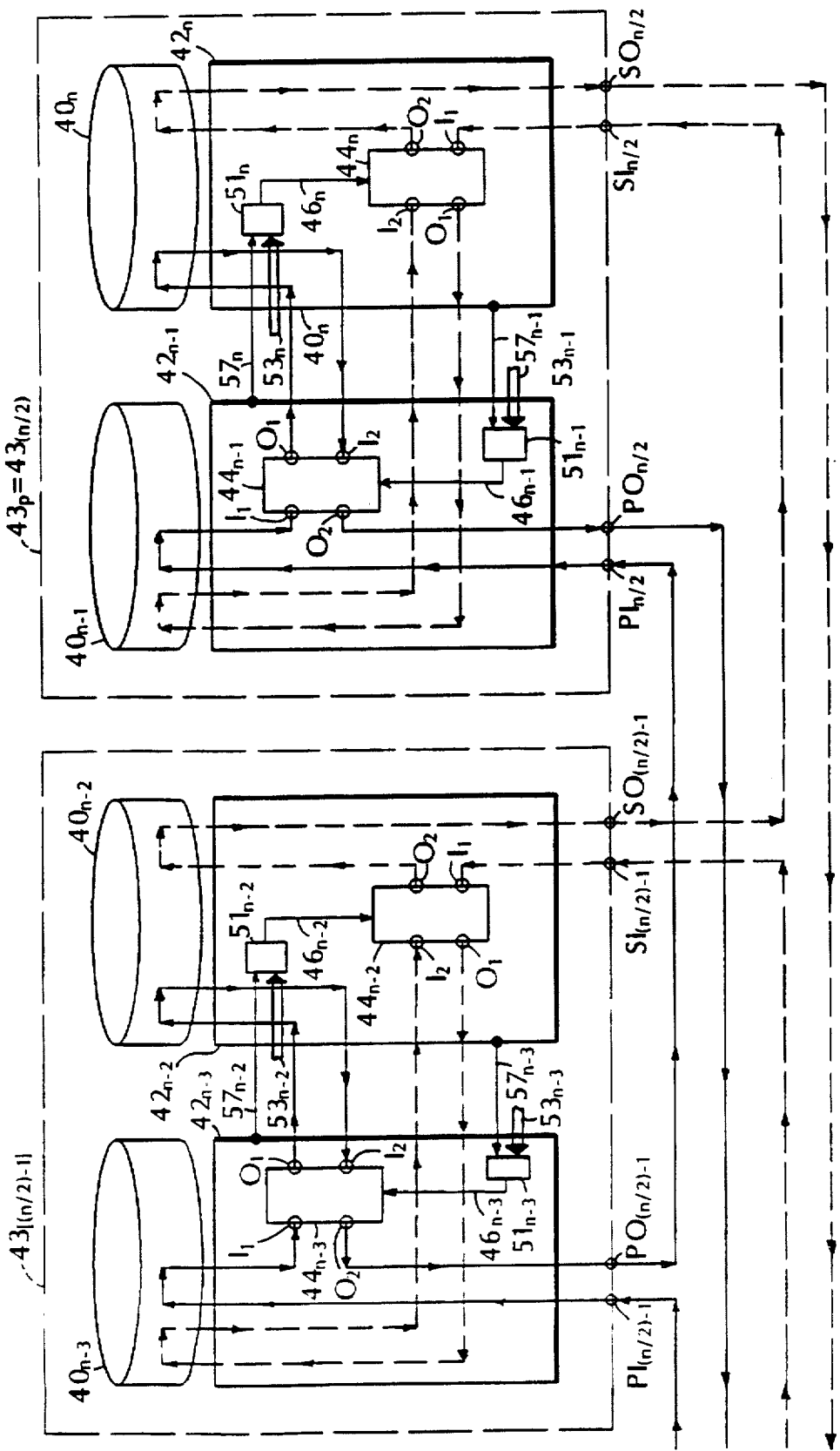

The control signal on line $46_1$ is produced by an addressable control section $51_1$, shown in FIG. 3 to include a PAL and an OR gate. The addressable control section $51_1$ is included in disk interface $42_1$. The addressable control section $51_1$ is addressable by controller $20_1$ (FIG. 1) via a separate control line bus $53_1$. More particularly, the bus $53_1$ is fed to address the PAL. The addressable control section $51_1$ is also fed by a signal on line $57_1$ generated by disk interface $42_2$ indicating that disk drive $40_2$ is inoperative. In response to the signals fed to the addressable control section $51_1$ from either disk controller $20_1$ on bus $53_1$ or the disk interface $42_2$ on line $57_1$, the addressable control section $51_1$ places switch $44_1$ in either the feed-through, or alternatively, by-pass condition. More particularly, addressable control section $51_1$ places switch $44_1$ in the by-pass condition if the disk drive $40_2$ is inoperative, as described above (i.e., via the signal on line $57_1$, or when disk controller $20_2$ becomes inoperative, as described above, via the signals on bus $53_1$. In like manner, the control signal on line $46_2$ is produced by an addressable control section $51_2$ included in disk interface $42_2$. The addressable control section $51_2$ is addressable by the primary controller $20_2$ (FIG. 1) via a separate control bus $53_2$ from controller $20_2$. The addressable control section $51_2$ is also fed by a signal on line $57_2$ generated by disk interface $42_2$ indicating that disk drive $40_1$ is inoperative. In response to the signals fed thereto from either controller $20_1$ on bus $53_2$ or the disk interface $42_1$ on line $57_2$, the addressable control section $51_2$ places switch $44_2$ in either the feed-through, or alternatively, by-pass condition. More particularly, addressable control section $51_2$ places switch $44_2$ in the by-pass condition if disk controller $20_1$ is inoperative, or if the disk drive $40_1$ becomes inoperative, as described above. Addressable control sections $51_3$-$51_n$, are included in the other disk interfaces $42_3$-$42_n$, in a similar manner.

Each one of the switches $44_1$-$44_n$ is disposed on a common printed circuit board with a corresponding one of the disk interface, $42_1$-$42_n$, respectively.

Figure 4:
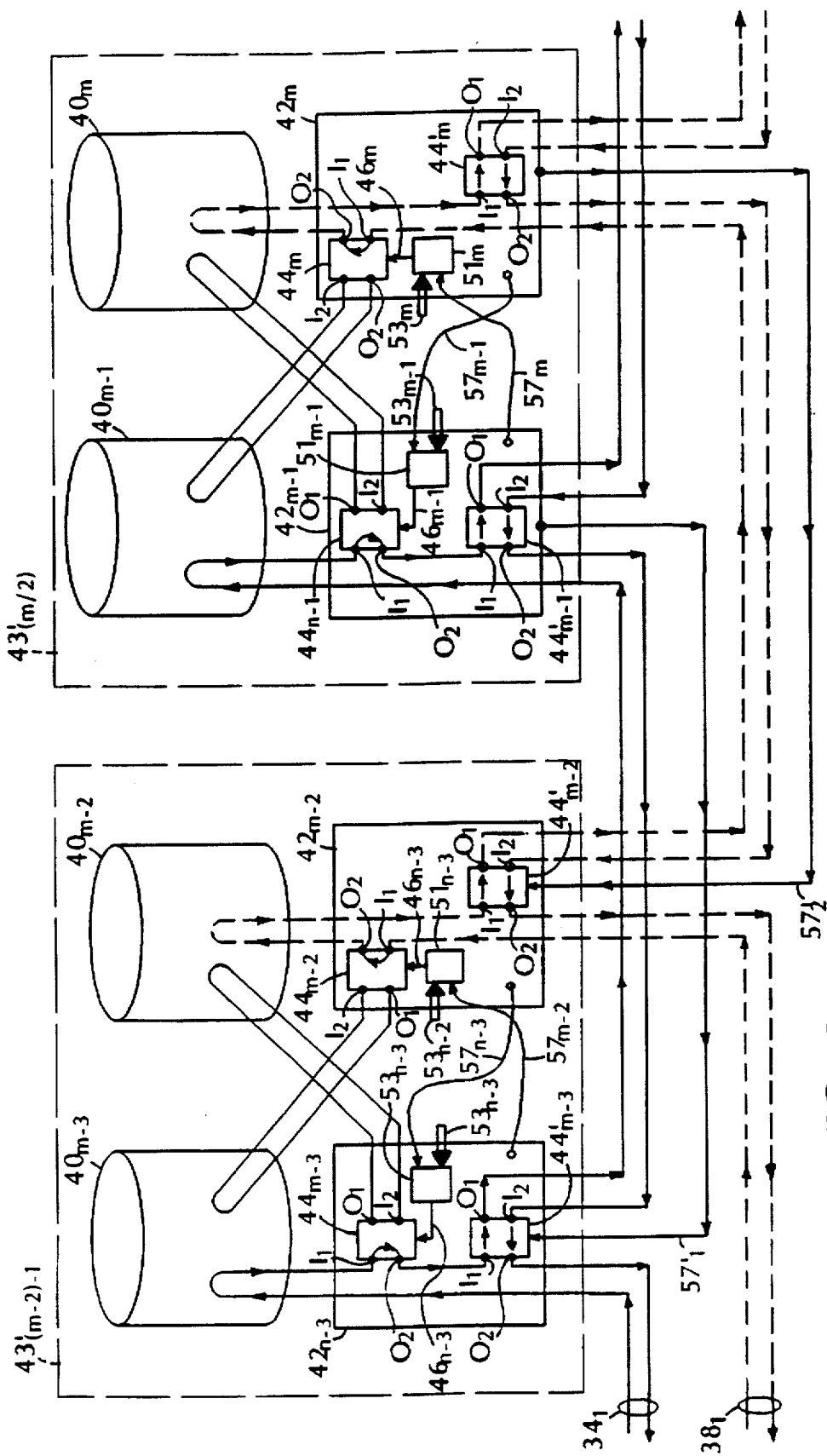
FIG. 4 is a block diagram of a pair of disk drives and their interfaces in accordance with an alternative embodiment of the invention.

Referring now to FIG. 4, an exemplary pair of cells $43'_{(m/2)-1}$, $43'_{m/2}$ is shown, where m is an integer between 1 and n. Cells $43'_{(m/2)-1}$, $43'_{m/2}$ differ from cells $43_1$-$43_{n/2}$ described above in connection with FIG. 2 in that each disk interface $42_1$, $42_n$, includes a second LRC switch $44'$. Thus, for the exemplary interfaces $42'_{m-3}$, $42'_{m-2}$, $42'_{m-1}$, such interfaces include switches $44_{m-3}$, $44_{m-2}$, $44_{m-1}$ and $44_m$, respectively, and switches $44'_{m-3}$, $44'_{m-2}$, $44'_{m-1}$, and $44'_m$, respectively, as shown. Switches $44_{m-3}$, $44_{m-2}$, $44_{m-1}$ and $44_m$ are normally in the by-pass condition as indicated and as described above in connection with FIGS. 1 and 2, while switches $44'_{m-3}$, $44'_{m-2}$, $44'_{m-1}$, and $44'_m$ are normally in the feed-through condition as indicated. Here again the primary fiber channel $34_1$ is indicated by the solid line and the secondary fiber channel $38_1$ is indicated by the dotted line, as in FIG. 1 and 2. A control signal is fed to switch $44'_{m-3}$ via control line $57'_1$ from disk interface $42'_{m-1}$, as shown. A control signal is fed to switch $44'_{m-2}$ via control line $57'_2$ from disk interface $42'_m$, as shown. Switches $44'_{m-3}$, $44'_{m-2}$, $44'_{m-1}$, and $44'_m$ are provided to enable "depopulation" of disk drives. For example, if disk drive $40_{m-1}$ is no longer required by the storage system 10, a control signal is produced on control line $57'_1$ to place switch $44'_{m-3}$ in the by-pass condition thereby making disk drive $40_{m-3}$ the last disk drive in the primary fiber channel 34. Likewise, if disk drive $40_m$ is removed, a control signal is produced on control line $57'_2$ to place switch $44'_{m-2}$ in the by-pass condition thereby making disk drive $40_{m-2}$ the last disk drive in the secondary fiber channel 34. Further, a fiber channel may be terminated at any point by the switches $44'$.

Other embodiments are within the spirit and scope of the appended claims.

What is claimed is:

1. A disk interface adapted for coupling a disk drive to a fiber channel to control the disk drive, such interface having:

an interface input port;

an interface output port;

a first switch having a pair of input ports and a pair of output ports, such first switch, in response to one state of a control signal coupling a first one of the pair of input ports to a first one of the pair of output ports and a second one of the pair of input ports to a second one of the pair of output ports, and in response to a second state, coupling the first one of the pair of input ports to the second one of the pair of output ports;

a second switch having a pair of input ports and a pair of output ports, such second switch, in response to one state of a control signal coupling a first one of the pair of input ports to a first one of the pair of output ports and a second one of the pair of input ports to a second one of the pair of output ports, and in response to a second state, coupling the first one of the pair of input ports to the second one of the pair of output ports;

a first one of the pair of first switch input ports being serially coupled to the interface through the disk drive;

one of the pair of first switch output ports being coupled to a first one of the pair of second switch input ports;

a first one of the second switch output ports being coupled to the interface output port;

the other one of the pair of first switch input ports and the other one of the pair of first switch output ports being adapted for coupling to another disk interface; and, the other one of the pair of second switch input ports and the other one of the pair of second switch output ports being adapted for coupling to the fiber channel.

2. A data storage system, comprising:

a plurality of disk interfaces, each one being adapted to control a storage disk drive coupled thereto, a first portion of the disk interfaces being adapted to receive signals from a first controller through a first channel and a second portion of the disk interfaces being adapted to receive data from a second controller through a second channel, each one of the disk interfaces in the first portion having:

a switch adapted to allow data to pass serially through the first channel; and, when the second channel becomes inoperative, couple an operative disk drive in the inoperative second channel serially to the first channel.

3. The data storage system recited in claim 2 wherein each one of the disk interfaces in the second portion has:

a switch adapted to allow data to pass serially through the second channel; and, when the first channel becomes inoperative, couple an operative disk drive in the inoperative first channel serially to the second channel.

4. A data storage system wherein each one of a plurality of disk interfaces is coupled to a corresponding storage disk drive, a first portion of the disk interfaces being connected sequentially in a first unidirectional channel, to a first disk controller and a second portion of the disk interfaces being coupled to a second controller through a second unidirectional channel:

each one of the first portions of the disk interfaces including a first switch, disposed in the first channel, adapted to allow data to pass to the next sequential disk drive in the first channel; and, when the second channel becomes inoperative, couple an operative disk drive in second channel to the first channel; and, each one of the disk interfaces in the second portion including a switch, disposed in the second channel, adapted to allow data to pass to the next sequential disk drive in the second channel; and, when the first channel becomes inoperative, couple an operative disk drives in first channel to the second channel.

5. A method for changing a disk drive in a data storage system, each one of a first portion of disk drives being coupled through a first fiber channel, each one of a second porion of the disk drives being coupled through a secondary fiber channel, each of the disk drives being coupled to a switch, comprising the step of:

operating the switch to remove the disk drive being changed from the first fiber channel and coupling the other disk drives in first fiber channel to the second fiber channel.

6. A disk interface adapted for coupling a disk drive to a fiber channel to control the disk drive, such interface having:

an interface input port;

an interface output port;

a switch having a pair of input ports and a pair of output ports, a first one of the pair of switch input ports being serially coupled to the interface through the disk drive, and one of the pair of output ports being coupled to the interface output port, the other one of the pair of input ports and the other one of the pair of output ports being adapted for coupling to another disk interface, such switch, in response to one state of a control signal coupling a first one of the pair of input ports to a first one of the pair of output ports and a second one of the pair of input ports to a second one of the pair of output ports, and in response to a second state, coupling the first one of the pair of input ports to the second one of the pair of output ports.

* * * * *